UNITED STATES PATENT OFFICE.

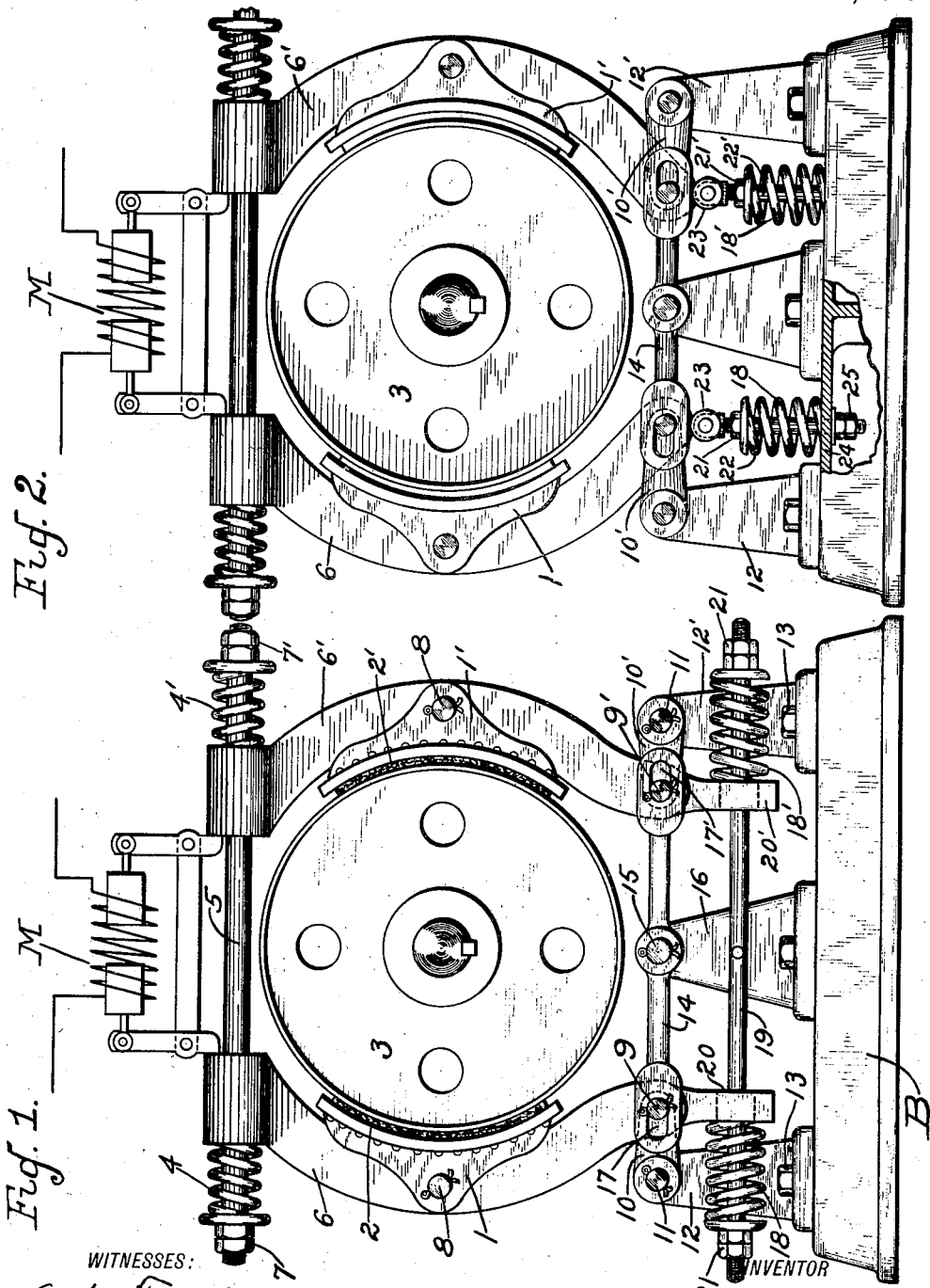

ARTHUR R. TREZISE, SR., OF BROOKLYN, NEW YORK, ASSIGNOR TO OTIS ELEVATOR COMPANY, OF JERSEY CITY, NEW JERSEY, A CORPORATION OF NEW JERSEY.

BRAKE.

1,166,725.   Specification of Letters Patent.   Patented Jan. 4, 1916.

Application filed December 24, 1913. Serial No. 808,551.

*To all whom it may concern:*

Be it known that I, ARTHUR R. TREZISE, Sr., a citizen of the United States, residing in Brooklyn, in the county of Kings and State of New York, have invented a new and useful Improvement in Brakes, of which the following is a specification.

My invention relates to improvements in brake apparatus more particularly of the shoe or band type, such as are commonly used on trains of cars, automobiles, hoists, etc., and one of its objects is to provide a brake apparatus wherein the brake levers carrying the brake shoes are capable of a rotary movement in a manner to release or "ease off" the brake shoes if for any reason the braking action is too severe, which action is frequently caused by a gummy condition of the leather lining on the brake shoes, which cause the latter to stick, upon the application thereof to the brake pulley.

It is common practice to apply oils of various kinds to the brake pulley to effect a smooth braking action, and in the course of time the oil collects dust, which of course is transmitted to the lining on the shoe. This mixture of oil and dust soon forms a gummy surface on the lining, causing the latter to stick to the brake pulley, thereby creating excessive friction, resulting in a severe braking action. To overcome this objectionable feature I provide means dependent on the friction between the pulley and shoes for effecting a variation in the amount of friction, said means permitting a rotary movement of the shoes to a releasing or "easing off" position. This arrangement eliminates shocks and jars, and materially decreases wear on the driving mechanism associated with the brake, such as for example a worm and gear connection of a well known type used for driving elevators. The latter is frequently started and stopped, and the worm and gear are subjected to "end thrust" caused by a severe braking action, which materially increases the wear thereon.

Referring to the drawings, Figure 1 shows a brake constructed in accordance with my invention, and adapted to be actuated by an electro-magnet, such brake being of a type particularly adapted for use on electrically driven elevators, and Fig. 2 shows a modified construction.

The mechanism in detail comprises brake shoes 1 and 1', each provided with a facing 2, of leather or other suitable material. These shoes are arranged to be applied to a brake pulley 3, by any suitable means such as a compressed air system now commonly used on a train of cars, or by means of heavy coil springs 4 and 4', carried on a rod 5, and acting on lever arms 6 and 6', respectively, the tension of said springs being adjusted by adjusting nuts 7 and 7'. The brake shoes are pivoted at 8 to the lever arms. Each of the lever arms are pivoted by pins 9 and 9' formed integrally with levers 10 and 10', respectively, said levers being fulcrumed at 11 and 11', respectively, in standards 12 and 12' fixed by bolts 13 to a bed plate B. This pivoted connection of the brake levers effects a movement of the brake shoes to a releasing or "easing off" position. The brake levers are supported by a rock arm 14, pivotally supported at 15, by a standard 16, secured to the bed plate. The pins 9 and 9' engage slots 17 and 17', respectively, formed in the arm 14, such pins moving loosely therein upon rotation of the levers 6 and 6' in either direction. The rock arm 14 as will readily be seen, also serves to equalize the movement of the levers 6 to their easing off position. This rotary movement of the levers in either direction is resisted by heavy springs 18 and 18' carried on a rod 19, said springs acting on arms 20 and 20', formed integral with the levers 6 and 6', respectively. It will be seen that the springs 18 and 18' determine the effective braking power of the springs 4 and 4', and by adjusting the tension of said springs 18 and 18' by means of adjusting nuts 21, the springs 4 and 4' can be made to apply with any predetermined braking power desired, irrespective of the condition of the brake shoes, as for example in case the shoes are worn considerably. In practice, the springs 18 and 18' are set at a tension sufficient to prevent a rotary movement of the brake levers 6 and 6', which action permits the springs 4 and 4' to apply the brake shoes with their maximum power, for a maximum load traveling at maximum speed, which in practice is the usual setting for said springs. If for any reason this braking action is too severe, caused for example by a gummy condition of the leather lining on the brake shoes, causing the same to stick, the increased friction resulting therefrom overcomes the action of the springs 18 and 18', and effects a movement of the levers 6 and 6' in a manner to ease off the brake shoes, the amount of movement of the brake shoes being proportional to the rotary speed of the brake pulley, thereby producing a smooth and easy stop.

In the modification shown in Fig. 2, a rotary movement of the brake levers is resisted by the springs 18 and 18' which in this instance act on rods 22 and 22', respectively, said rods carrying anti-friction rollers 23, which co-act with the arm 14 at its outer ends. The said springs are positioned between the top 24 of the bed plate, and adjusting nuts 21 and 21', respectively. The movement of the rods 22 and 22' is limited by stop nuts 25 and 25', the springs being set at a tension heretofore referred to, so that the rods 22 and 22' resist a rotary movement in either direction of the brake levers 6 and 6'.

Any of the well known devices such as compressed air, or electromagnetic devices can be adapted to actuate the levers 6 and 6' to their releasing position, the electromagnet M being shown simply for the sake of illustration and forming no part of the present invention.

Obviously various changes in the details of construction and arrangement of parts can be made by those skilled in the art, without departing from the spirit and scope of my invention. I therefore wish not to be limited to the precise details in construction and arrangement of parts herein shown and described.

What I claim as new and desire to protect by Letters Patent of the United States is:—

1. The combination with a moving member, of a brake therefor, comprising shoes on opposite sides of said moving member; means for applying the brake, and means dependent on the friction between the movable member and brake shoes for effecting a variation in the amount of effective braking power of the brake applying means.

2. The combination with a moving member, of a brake therefor, comprising shoes on opposite sides of said moving member; means for applying the brake shoes, and means for automatically releasing the latter simultaneously when the friction between the moving member and brake exceeds a predetermined amount.

3. The combination with a brake pulley, brake shoes on opposite sides of said brake pulley, means for applying the shoes to the pulley, and means dependent on the friction between the pulley and shoe for releasing the latter simultaneously.

4. The combination with a brake pulley, a pair of brake shoes on opposite sides of said brake pulley, means for applying the shoes to the pulley, and automatically operated adjustable means for momentarily releasing the pair of shoes simultaneously from the pulley when the friction between said shoes and pulley exceeds a predetermined amount.

5. The combination with a moving member, brake apparatus therefor, comprising shoes on opposite sides of said moving member; means for applying the brake, said brake apparatus being constructed and arranged to effect a momentary decrease in the amount of effective braking power of the brake applying means when the friction between the moving member and brake shoes exceeds a predetermined amount.

6. The combination with a moving member, and a brake associated therewith comprising shoes on opposite sides of said moving member, said brake shoes being capable of movement automatically and simultaneously to an "easing off" position when the friction between the brake and moving member exceeds a predetermined amount.

7. The combination with a brake pulley, brake shoes associated therewith capable of movement to a releasing position, means for applying the shoes to the pulley, and adjustable yielding means dependent on the friction between the pulley and shoes for controlling the amount of movement of the shoes to releasing position.

8. The combination with a brake pulley, brake shoes associated therewith capable of movement to a releasing position, means for applying the shoes to the pulley, and automatically operated adjustable yielding means for controlling the amount of movement of the shoes to releasing position.

9. The combination with a rotating member, brake shoes associated therewith movable in a manner to effect a variation in the amount of frictional engagement therebetween, means for effecting a frictional engagement between the rotating member and brake shoes, and automatic means under compression for effecting a variation in the amount of said frictional engagement between the rotating member and brake shoes.

10. The combination with a brake pulley, brake shoes associated therewith capable of movement to a releasing position, means for applying the brake shoes, and means under compression adapted to resist the movement of the shoes to releasing position, said means being adjustable to permit said movement of the brake shoes when the friction between the pulley and shoes exceeds a predetermined amount.

11. The combination with a brake pulley, brake shoes associated therewith, means for carrying the brake shoes, a pivoted connection therefor adapted to rock the shoes to a releasing position, means for applying the brake shoes to the pulley, compression springs adapted to resist said movement of the brake shoes, the tension of said springs being adjustable and set at a tension to permit the movement of the shoes to releasing position when the friction between the pulley and shoes exceeds a predetermined amount.

In testimony whereof, I have signed my name to this specification in the presence of two subscribing witnesses.

ARTHUR R. TREZISE, Sr.

Witnesses:
 JAMES G. BETHELL,
 WALTER C. STRANG.